(12) United States Patent
Umeda et al.

(10) Patent No.: US 9,065,717 B2
(45) Date of Patent: Jun. 23, 2015

(54) RECEIVER AND SYNCHRONIZATION CORRECTING METHOD

(71) Applicants: FUJITSU LIMITED, Kawasaki-shi, Kanagawa (JP); FUJITSU SEMICONDUCTOR LIMITED, Yokohama-shi, Kanagawa (JP)

(72) Inventors: Masataka Umeda, Yokohama (JP); Naoto Adachi, Yokohama (JP); Hiroaki Takagi, Akishima (JP)

(73) Assignees: FUJITSU LIMITED, Kawasaki (JP); FUJITSU SEMICONDUCTOR LIMITED, Yokohama (JP)

( * ) Notice: Subject to any disclaimer, the term of this patent is extended or adjusted under 35 U.S.C. 154(b) by 0 days.

(21) Appl. No.: 14/183,146

(22) Filed: Feb. 18, 2014

(65) Prior Publication Data

US 2014/0294128 A1 Oct. 2, 2014

(30) Foreign Application Priority Data

Mar. 29, 2013 (JP) ................................. 2013-075036

(51) Int. Cl.
*H04L 27/26* (2006.01)
*H04L 25/02* (2006.01)

(52) U.S. Cl.
CPC ........ *H04L 27/2657* (2013.01); *H04L 25/0204* (2013.01); *H04L 25/0224* (2013.01)

(58) Field of Classification Search
CPC .............. H04L 25/0204; H04L 5/0048; H04L 27/2647; H04L 25/022; H04L 25/0232; H04L 5/0007; H04L 2025/03414; H04L 1/06; H04L 25/0202; H04L 25/0226; H04L 25/0234; H04L 25/03834; H04L 27/2657
See application file for complete search history.

(56) References Cited

U.S. PATENT DOCUMENTS

| | | | |
|---|---|---|---|
| 2007/0036231 A1* | 2/2007 | Ido ................................. | 375/260 |
| 2008/0198942 A1* | 8/2008 | Akella et al. .................. | 375/260 |
| 2009/0046815 A1* | 2/2009 | Oh et al. ........................ | 375/340 |
| 2009/0059885 A1* | 3/2009 | Sadek et al. ................... | 370/343 |
| 2010/0008346 A1* | 1/2010 | Shirakata et al. ............. | 370/343 |
| 2010/0085866 A1* | 4/2010 | Li et al. .......................... | 370/208 |
| 2010/0195668 A1* | 8/2010 | Robert et al. .................. | 370/475 |
| 2011/0164671 A1* | 7/2011 | Matsumura .................... | 375/229 |
| 2011/0242428 A1* | 10/2011 | Blouin et al. .................. | 348/726 |

(Continued)

FOREIGN PATENT DOCUMENTS

| | | |
|---|---|---|
| JP | 2002-290373 A | 10/2002 |
| JP | 2008-211365 A | 9/2008 |

(Continued)

*Primary Examiner* — Hirdepal Singh
(74) *Attorney, Agent, or Firm* — Arent Fox LLP

(57) ABSTRACT

A receiver includes a transformation part configured to convert a time domain received signal to a frequency domain signal, a known signal extraction part configured to extract a known signal from the frequency domain signal, an estimation part configured to estimate a channel characteristic based upon the extracted known signal, a time direction extraction part configured to extract channel characteristic values of a particular carrier in a time direction from the estimated channel characteristic, a power spectrum acquiring part configured to acquire a power spectrum from the channel characteristic values extracted in the time direction, an error calculation part configured to calculate a carrier frequency error from the power spectrum, and a carrier correction part configured to correct for a carrier frequency of the received signal based upon the carrier frequency error.

16 Claims, 10 Drawing Sheets

(56) References Cited

U.S. PATENT DOCUMENTS

| | | | | |
|---|---|---|---|---|
| 2011/0244807 A1* | 10/2011 | Yoon et al. | | 455/67.11 |
| 2011/0255488 A1* | 10/2011 | Lee et al. | | 370/329 |
| 2012/0027140 A1* | 2/2012 | Weng et al. | | 375/350 |
| 2012/0170480 A1* | 7/2012 | Ido et al. | | 370/252 |
| 2013/0114659 A1* | 5/2013 | Murakami et al. | | 375/224 |
| 2013/0301685 A1* | 11/2013 | Ma et al. | | 375/147 |
| 2014/0198881 A1* | 7/2014 | Nishikawa | | 375/300 |

FOREIGN PATENT DOCUMENTS

| | | |
|---|---|---|
| JP | 2009-164887 A | 7/2009 |
| JP | 2010-062865 A | 3/2010 |

* cited by examiner

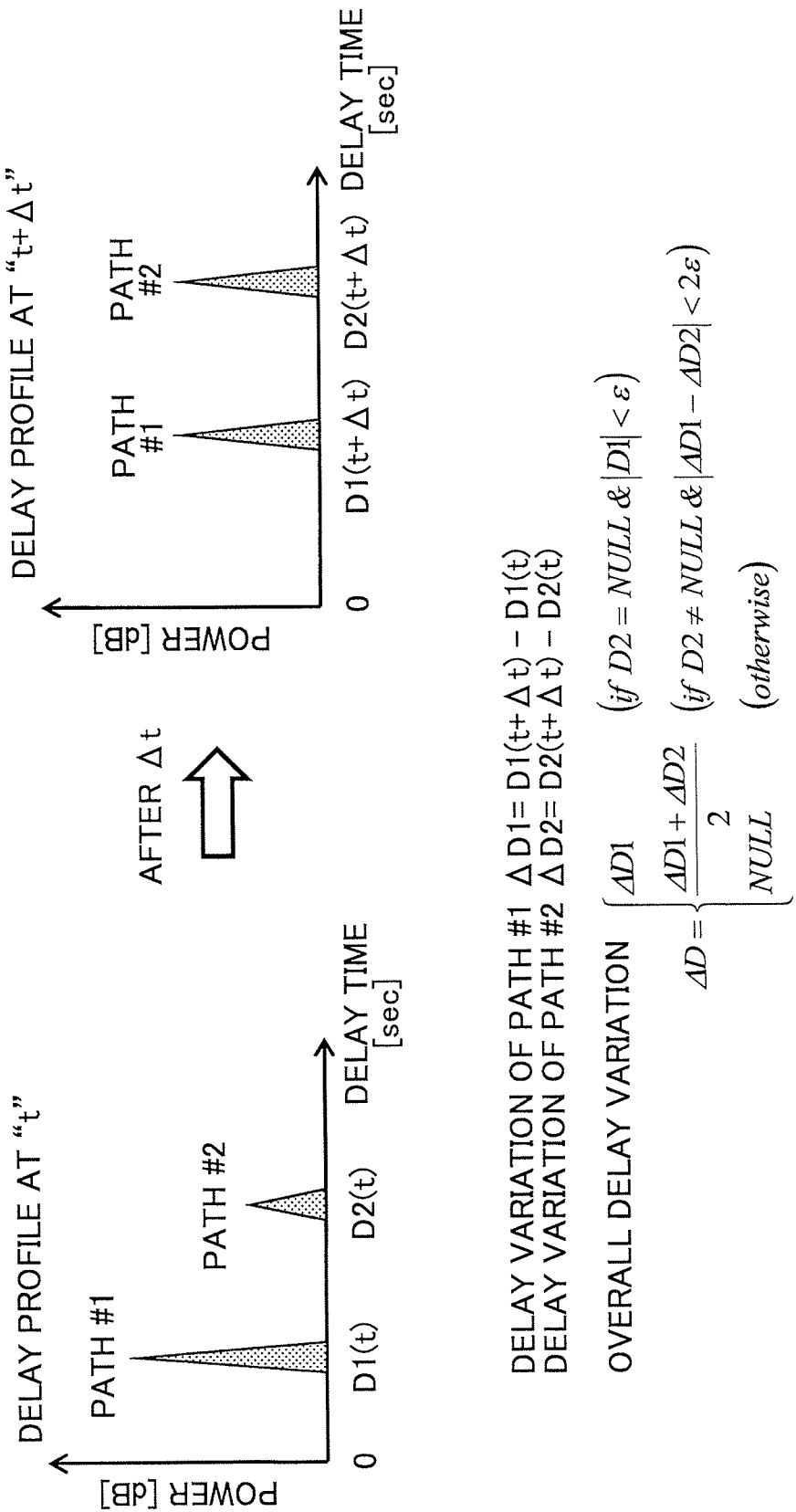

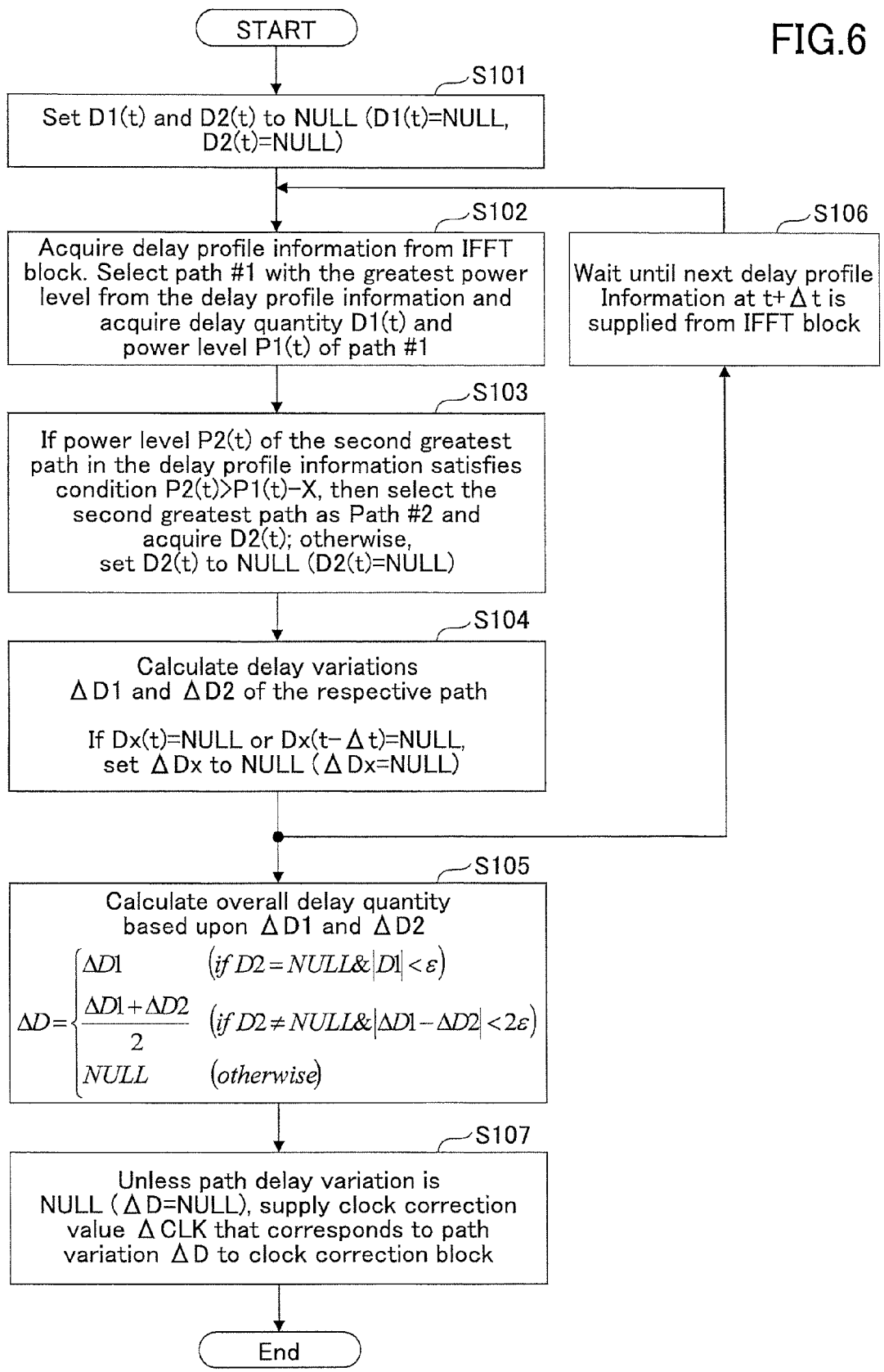

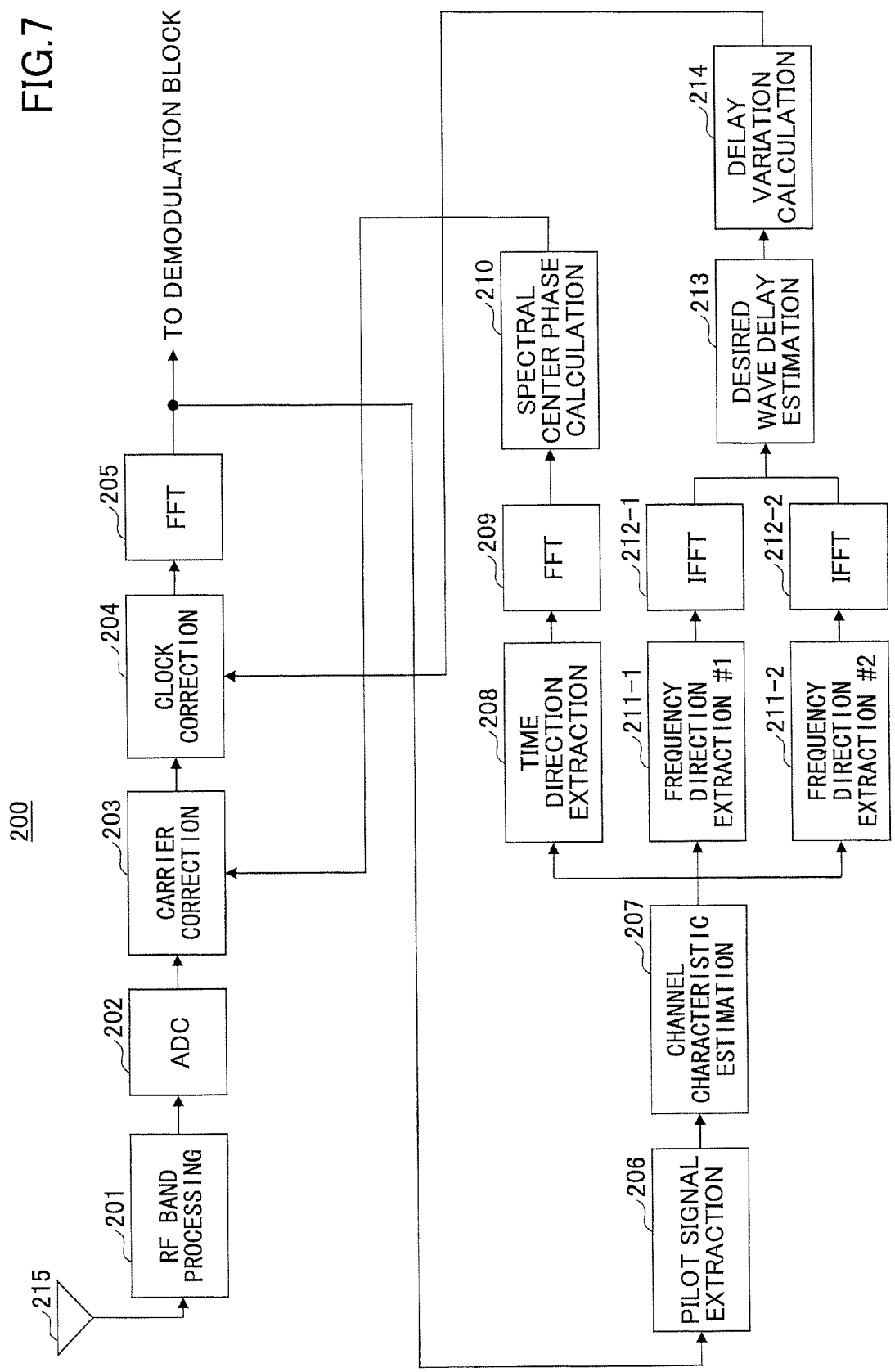

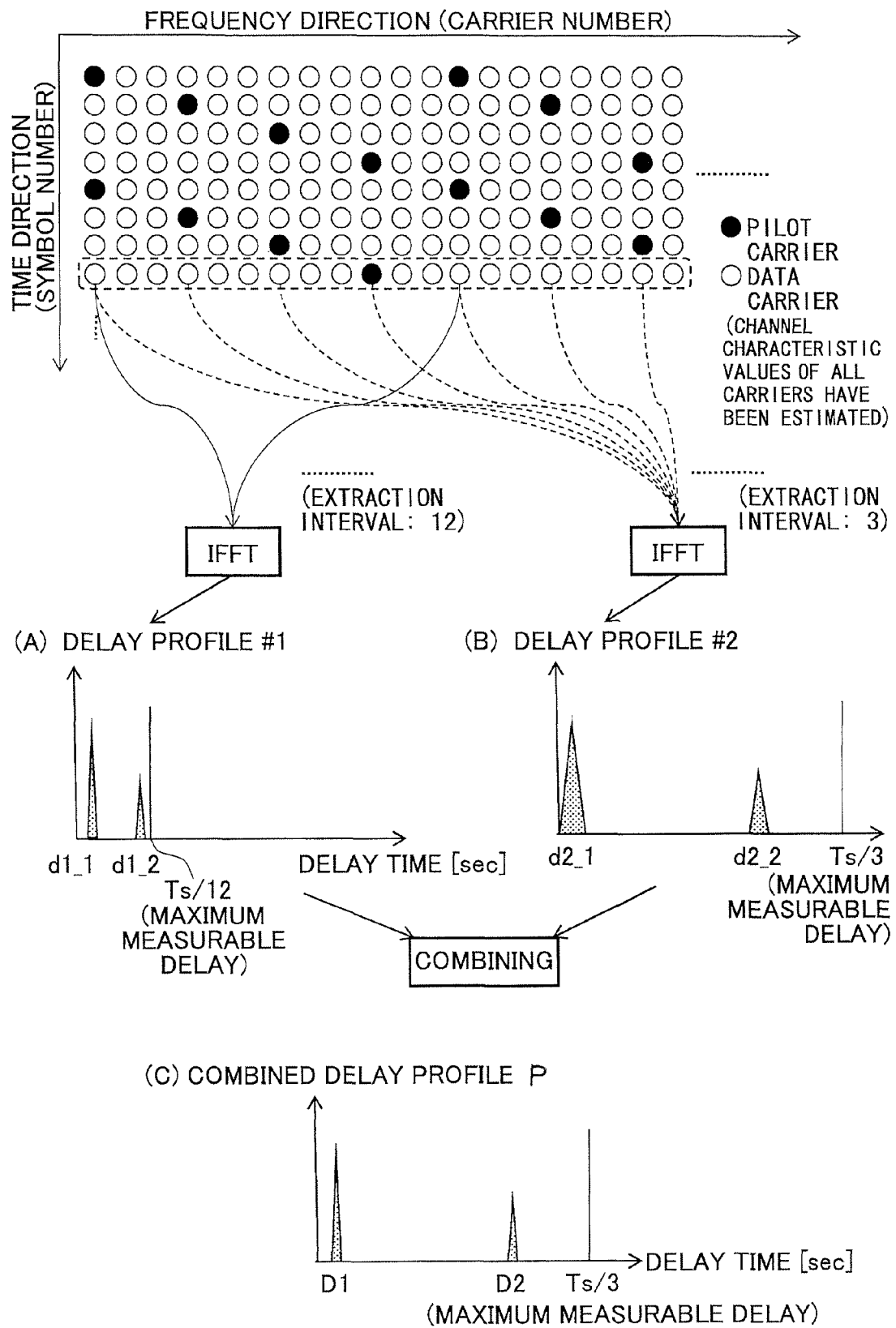

RECEIVER AND SYNCHRONIZATION CORRECTING METHOD

CROSS REFERENCE TO RELATED APPLICATIONS

This application is based upon and claims benefit of priority of Japanese Patent Application No. 2013-075036 filed Mar. 29, 2013, which is incorporated herein by reference in its entirety.

FIELD

The embodiments discussed herein are related to a receiver and a synchronization correcting method.

BACKGROUND

In recent years and continuing, orthogonal frequency division multiplexing (OFDM) has been attracting attention as a transmission scheme of wireless communications. OFDM is robust against multipath propagation and efficient in use of frequency. In an OFDM system, multiple sub-carriers orthogonal to each other are provided in a transmission band, and data values are allocated to the amplitude and the phase of each sub-carrier to perform digital modulation. Because multiple sub-carriers are transmitted in parallel, the frequency band allocated to each sub-carrier becomes narrow. The amount of signals per symbol time is reduced, and therefore, the modulation rate is slow. Meanwhile, because of the low modulation rate, OFDM is insusceptible to multipath interference.

In an OFDM receiver, various types of synchronization processes are performed on the demodulation circuit. As for a clock signal that has an effect on the entire process of demodulation, a difference in the oscillation frequencies between a transmitter's clock oscillator and a receiver's clock oscillator causes a synchronization offset, and the signal receiving performance is degraded. In order to synchronize the receiver's clock frequency with the transmitter's clock frequency, the receiver's clock frequency is generally corrected.

Besides, the carrier frequency of a sub-carrier may vary due to frequency offset and phase offset of a local oscillator. In this case, orthogonality between sub-carriers of the OFDM signals are lost, and inter-carrier interference will occur. Accordingly, correction for the carrier frequencies of sub-carriers is also important for the signal receiving quality.

It has been proposed to make use of pilot signals, which are known signals scattered in an OFDM frame, to correct a carrier frequency or a clock frequency. See, for example, Japanese Laid-open Patent Publication No. 2002-290373. With this technique, the characteristics of the amplitude and the phase of a pilot signal are detected, and inverse fast Fourier transform (IFFT) is performed on the detected characteristics. The signal component acquired through the IFFT is used to correct both the carrier frequency and the clock frequency.

To be more precise, a peak position of the desired wave component is detected from the IFFT output, and a carrier phase error (which corresponds to a carrier frequency error) is detected from the amplitude and the phase at the peak position. In addition, based upon a delay time offset at the peak position of the desired wave, symbol synchronization phase error and clock phase error, which phase errors relate to a clock frequency error, are detected. Then, appropriate corrections are made to the carrier phase and the clock phase, corresponding to the carrier phase error and the clock phase error, respectively.

By using a delay profile acquired from the IFFT computation, desired waves and interfering waves can be separated according to a delay time. Hence, carrier correction and clock correction based upon a delay profile are insusceptible to multipath interference.

However, in a multipath environment where two or more desired waves exist at different delay times and where the phase excursions (or carrier frequencies) of the desired waves are different from each other, a problem will occur. When performing carrier correction based upon the phase excursion of one of the desired waves, an offset will occur from the phase excursions (or the carrier frequencies) of the other desired waves, and the signal receiving quality is degraded.

In addition, when detecting a clock phase error using the delay time offset of the desired wave component contained in the IFFT output, the resolution performance and the maximum delay time analyzable from the IFFT output values depend on the number of points of IFFT computation and the input interval of frequencies. If the number of IFFT points is insufficient, the resolution of clock error detection is degraded.

Hence, if there are several desired waves at different delay times, and if the carrier frequencies and the clock frequencies are different among the desired waves, synchronization correction process may not converge at the optimum position.

It is desired to provide a technique of appropriate correction for synchronization offsets of carrier frequencies and clock frequencies of desired waves even if there are multiple desired waves at different delay times and different carrier frequencies.

SUMMARY

According to an aspect of the embodiments, a receiver includes a transformation part configured to convert a time domain received signal to a frequency domain signal, a known signal extraction part configured to extract a known signal from the frequency domain signal, an estimation part configured to estimate a channel characteristic based upon the extracted known signal, a time direction extraction part configured to extract channel characteristic values of a particular carrier in a time direction from the estimated channel characteristic, a power spectrum acquiring part configured to acquire a power spectrum from the channel characteristic values extracted in the time direction, an error calculation part configured to calculate a carrier frequency error from the power spectrum, and a carrier correction part configured to correct for a carrier frequency of the received signal based upon the carrier frequency error.

The objects and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 5 illustrates calculation of delay variation using a delay profile;

FIG. 6 is a flowchart of clock correction;

FIG. 7 is a schematic diagram of a receiver according to the second embodiment;

FIG. 8 illustrates combining of multiple delay profiles;

DESCRIPTION OF EMBODIMENTS

The embodiments are described below with reference to the drawings. In the embodiments, channel characteristic values of a particular carrier number are extracted in a time direction (i.e., in an OFDM symbol direction), and a Fourier transform process is performed on the extracted components to acquire a power spectrum. This power spectrum is used to correct for a carrier frequency of the received signal.

The acquired power spectrum has a waveform similar to a so-called Doppler spectrum. If there is an offset between a transmission-end carrier frequency and a receiving-end carrier frequency, the center of the power spectrum shifts to the left or the right. In the embodiments, correction is made to the carrier frequency so as to bring the center of the power spectrum to an appropriate position.

The power spectrum acquired through a Fourier transform operation creates a waveform in which the phase excursions (or the carrier frequencies) of multiple desired waves are combined. Accordingly, the carrier frequencies can be corrected in accordance with the median of the phase excursions of the desired waves.

In another embodiment, to improve the correction accuracy for clock frequencies, two or more delay profiles with different carrier intervals are used to estimate channel characteristic values in the frequency direction, which values are to be subject to IFFT computation. By combining the two or more delay profiles, the resolution of the delay variation in the desired waves can be improved.

First Embodiment

Figure 1:
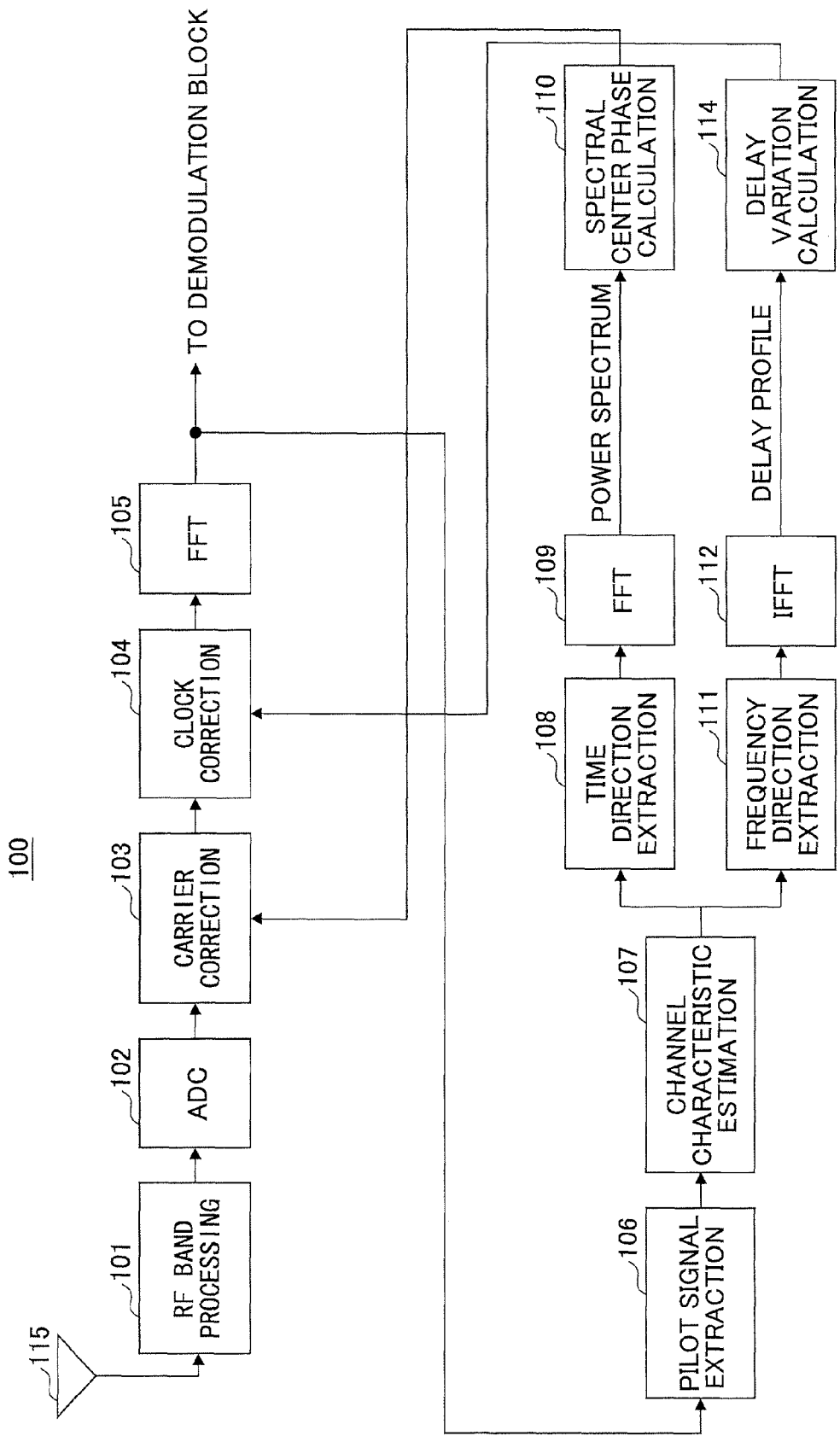
FIG. 1 is a schematic diagram of a receiver according to the first embodiment.

FIG. 1 is a schematic diagram of a receiver 100 according to the first embodiment. The receiver 100 receives an OFDM signal at a receiving antenna 115. An RF band processing part 101 amplifies the received OFDM signal at a radio frequency (RF) band and performs various types of filtering operations to downconvert the high-frequency signal to an intermediate frequency (IF) signal. An analog-to-digital converter (ADC) 102 converts the received analog signal to a digital signal. A carrier correction part 103 performs carrier correction on the digitized received signal so as to synchronize the received signal with a transmitter's carrier frequency. A clock correction part 104 performs clock correction on the digitized received signal to synchronize the received signal with the transmitter's clock frequency.

The carrier correction part 103 multiplies the received signal by a sinusoidal wave $\exp(j\theta)$ that corresponds to the synchronization offset of the carrier frequency to correct for the frequency range of the received signal. Carrier correction is performed typically in parallel with orthogonal modulation for converting the IF band signal (at center frequency) output from the ADC 102 to a base band signal.

The clock correction part 104 performs phase correction corresponding to a clock frequency error and interpolation on the received signal so as to compensate for the clock frequency offset between the transmitter's clock frequency and the receiver's clock frequency.

With the structure illustrated in FIG. 1, carrier correction and clock correction are performed on the digital signal output from the ADC 102; however, carrier correction and clock correction may be performed on the analog signal before the analog-to-digital conversion. In the latter case, the carrier correction part 103 and the clock correction part 104 are arranged before the ADC 102.

A fast Fourier transform (FFT) computation part 105 performs FFT computation on the received signal having been subjected to carrier correction and clock correction. Through the FFT computation, the digital-sampled time domain signal is converted to a frequency domain signal. An OFDM signal is a signal in which multiple sub-carriers are multiplexed in the frequency domain, and an independent data item is transported on each of the sub-carriers of the frequency domain signal.

Figure 2:
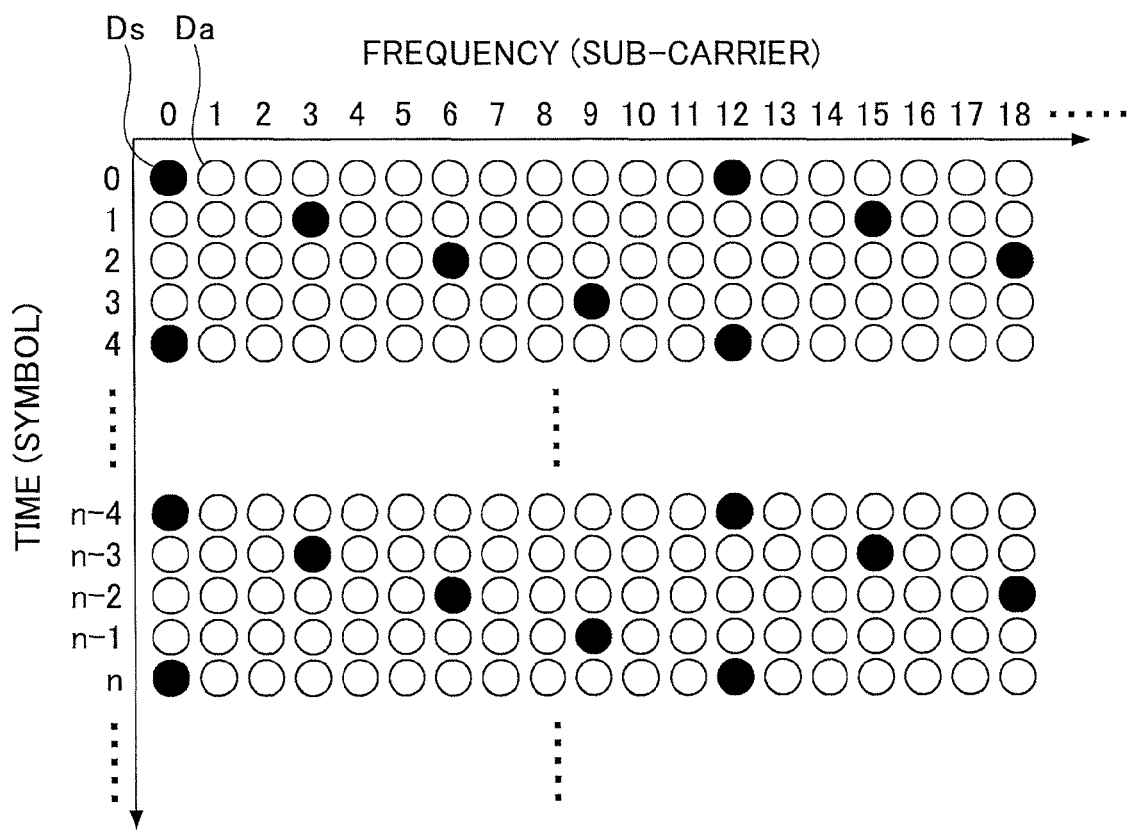
FIG. 2 illustrates an OFDM frame of terrestrial digital broadcasting.

FIG. 2 illustrates an OFDM frame of integrated service digital broadcasting-terrestrial (ISDB-T) as an example of OFDM sub-carriers arrangement. The white circles $D_a$ represent data carriers that transport data to be transmitted from a sender to a receiver. The black circles $D_s$ represent pilot carriers that transport known signals (pilot signals) defined by technical standards.

Returning to FIG. 1, a pilot signal extraction part 106 extracts a pilot signal carried on the known pilot carrier from the post-FFT frequency domain signal. A channel characteristic estimation part 107 estimates a channel characteristic value at the position of the pilot carrier. The channel characteristic estimation part 107 interpolates channel characteristic values of one or more pilot carrier positions to estimate channel characteristic values of data carrier positions. The estimated channel characteristic values are supplied to a time direction extraction part 108 and a frequency direction extraction part 111. The outputs of the channel characteristic estimation part 107 are also connected to inputs of a demodulation block although not illustrated in the figure.

Figure 3:
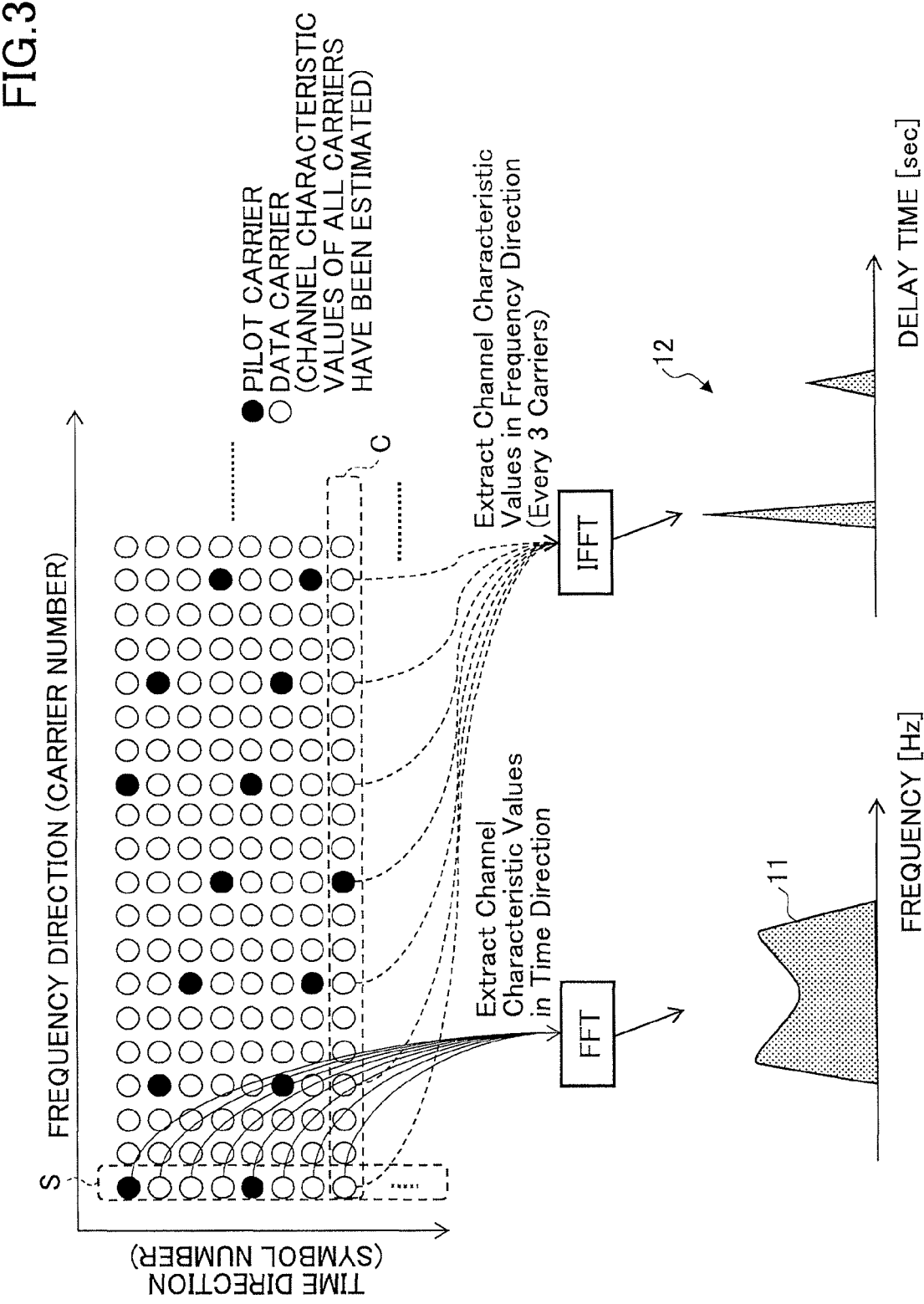
FIG. 3 illustrates how to acquire a power spectrum and a delay profile.

FIG. 3 illustrates time direction extraction and frequency direction extraction. The time direction extraction part 108 extracts channel characteristic values of a particular carrier number in the time direction. "Extraction in the time direction" of the channel characteristic values of a particular carrier number means taking out the channel characteristic values of a certain carrier in the direction "S" of OFDM symbols, as indicated by the dashed line "S". An FFT computation part 109 performs fast Fourier transform on the channel characteristic values extracted in the time direction (or the OFDM symbol direction) to acquire a power spectrum 11. The power spectrum 11 has a waveform in which phase variations of the multiple paths are combined, which waveform is similar to the Doppler spectrum waveform.

A spectrum center phase calculation part 110 (FIG. 1) calculates a center phase or a center frequency $f_c$ of the acquired power spectrum 11, and feeds a difference (or an error) between the center phase and a target value as a correction value back to the carrier correction part 103. The carrier correction part 103 shifts the center frequency $f_c$ of the power spectrum 11 to the target position based upon the correction value, thereby correcting the carrier frequency.

Figure 4A:
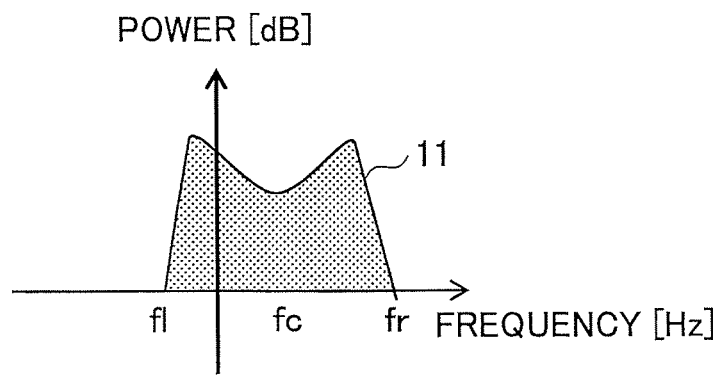
FIG. 4A is a diagram for explaining carrier frequency correction using a power spectrum.
Figure 4B:
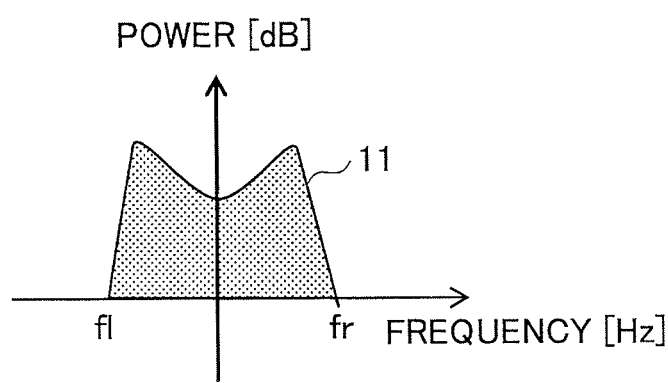
FIG. 4B is a diagram for explaining carrier frequency correction using a power spectrum.

FIG. 4A and FIG. 4B illustrate correction for the carrier frequency performed by the spectrum center phase calculation part 110 and the carrier correction part 103. If a carrier frequency synchronization offset is occurring, the center frequency $f_c$ of the power spectrum 11 shifts from the reference position, as illustrated in FIG. 4A. The spectrum center phase calculation part 110 measures a low-frequency end $f_l$ of the left-hand side and a high-frequency end $f_r$ of the right-hand side of the power spectrum 11 output from the FFT computation part 109 to calculate the center frequency $f_c$ of the power spectrum 11 ($f_c=f_1+(f_1+f_r)/2$).

Then, an error which is a difference between the center frequency fc and the target value is calculated, and the error is fed back to the carrier correction part 103. In FIG. 4A, the target value is set to the point of origin along the frequency axis as a matter of convenience.

The carrier correction part 103 shifts the power spectrum so as to bring the center frequency $f_c$ to the target position, as illustrated in FIG. 4B.

Returning to FIG. 3, the frequency direction extraction part 111 extracts channel characteristic values of a particular OFDM symbol in the frequency direction or the carrier direction "C". An IFFT computation part 112 performs inverse fast Fourier transform on the extracted values to acquire a delay profile 12 with respect to delay times or delay quantities. During the extraction, the frequency direction extraction part 111 performs extraction in the frequency direction "C" at certain carrier intervals. In the example of FIG. 3, channel characteristic values are extracted every three carriers.

If there is a difference or an error between a transmitter's clock frequency and a receiver's clock frequency, the delay time (the delay quantity) of the desired wave varies at the receiver. A delay variation calculation part 114 monitors a peak delay time of the desired signal contained in the delay profile 12 and determines a peak variation by taking a difference from the previously monitored peak delay time. Then, a clock error that corresponds to the peak variation is determined and fed back to the clock correction part 104.

If there are two or more desired waves having similar peak power levels existing in the delay profile 12, the peak power levels vary as time passes. The desired wave with the maximum power level also changes. A variation in delay time caused by the fact that the desired wave with the maximum peak power level has changed may be selected by mistake to set a clock correction value.

To prevent such mistake, a two-path (2-path) model illustrated in FIG. 5 is proposed in the embodiment. The delay variation calculation part 114 monitors the desired waves of two paths, namely, Path #1 and Path #2, and calculates delay times D1(t) and D2(t) of the respective paths at time "t". After time Δt, by determining a difference between delay time D1(t) and delay time D1(t+Δt) of Path #1 and a difference between delay time D2(t) and delay time D2(t+Δt) of path #2, a delay variation ΔD1 of the Path #1 and a delay variation ΔD2 of the path #2 are acquired.

The delay variation is expressed by Formula (1).

$$\Delta D1 = D1(t+\Delta t) - D1(t)$$

$$\Delta D2 = D2(t+\Delta t) - D2(t) \quad (1)$$

If Path #2 is not "Null" and if the delay variations ΔD1 and ΔD2 of the two paths are close to each other (for example, if the difference between ΔD1 and ΔD2 is smaller than a prescribed value), the average of the delay variations of the two paths is selected as an overall delay variation ΔD.

If Path #2 is "Null" and the delay time D1 of Path #1 is smaller than a prescribed value, the delay variation ΔD1 of Path #1 is selected as the overall delay variation ΔD.

Otherwise, "Null" is inserted to the delay variation ΔD in the sense of an unmeasurable state.

The overall delay variation ΔD is expressed by Formula (2).

$$\Delta D = \begin{cases} \Delta D1 & \text{(if } D2 = \text{NULL \&} |D1| < \varepsilon) \\ \dfrac{\Delta D1 + \Delta D2}{2} & \text{(if } D2 \neq \text{NULL \&} |\Delta D1 - \Delta D2| < 2\varepsilon) \\ \text{NULL} & \text{(otherwise)} \end{cases} \quad (2)$$

Unless the overall delay variation ΔD is "Null", a clock frequency correction value ΔCLK that corresponds to delay variation ΔD is fed back to the clock frequency correction part 104. If the overall delay variation ΔD is "Null", nothing is done.

FIG. 6 is a flowchart of operations performed by the delay variation calculation part 114. First, initial values of D1(t) and D2(t) are set to "Null" at the beginning of the operations (D1(t)=NULL, D2(t)=NULL) (S101).

Then, a delay profile 12 is acquired from the IFFT computation part 112 and Path #1 with the maximum power level is selected from the delay profile 12 to acquire delay time D1(t) and power level P1(t) of Path #1 (S102).

Then, Path #2 is selected from the delay profile 12 (S103). For example, if the power level P2(t) of the second greatest path satisfies Formula (3), that path is selected as Path #2 and delay time D2(t) of Path #2 is acquired in S103.

Formula (3) is expressed below.

$$P2(t) > P1(t) - X \quad (3)$$

where X is an arbitrary value.

If the power level P2(t) of the second greatest path does not satisfy Formula (3), delay time D2(t) of Path 2 is set to "Null" (D2(t)=NULL) in S103.

For Path #1 and Path #2, the delay time D1(t) and D2(t) are compared with the previous delay times (Δt earlier) to calculated delay variations ΔD1 and ΔD2 of the respective paths based upon Formula (1) (S104). If either Dx(t) or Dx(t−ΔD1 and Δt) is "Null" (Dx(t)=NULL or Dx(t−Δt)=NULL), the delay variation ΔDx is set to "Null" in S104.

Then the process is held until a new delay profile at the next time t+Δt is reported from the IFFT computation part 112 (S106). Upon receiving the next delay profile, steps S102 to S104 are repeated.

Every Δt, an overall delay variation ΔD is calculated using Formula (2) based upon delay variations ΔD1 and ΔD2 of the respective paths acquired in S104 (S105).

Unless the overall delay variation (or path variation) ΔD is "Null", a clock correction value ΔCLK that corresponds to the delay variation ΔD is fed back to the clock correction part 104 (S107).

In the embodiment, FFT is applied to the channel characteristic values estimated in the time direction (or the symbol direction) to acquire a power spectrum used for carrier correction. On the other hand, IFFF is applied to the channel characteristic values estimated in the frequency direction to acquire a delay profile used for clock correction. Clock correction values are determined according to the operation flow of FIG. 6. Accordingly, both carrier frequency synchronization error and clock frequency synchronization error can be corrected appropriately.

Second Embodiment

FIG. 7 is a schematic diagram of a receiver 200 according to the second embodiment. In the second embodiment, to improve the clock frequency error accuracy, frequency-direction extraction is performed at different extraction intervals to acquire two or more sets of frequency-direction channel characteristic values (channel estimation values). IFFF is applied to the respective sets of frequency-direction channel estimation values to acquire two or more delay profiles. The acquired delay profile are combined to estimate path delay times or delay quantity (D1, D2) of the desired waves. Based upon the delay quantities of the respective paths, calculation of delay variations (ΔD1, ΔD2) is performed, followed by calculation of a clock correction value ΔCLK.

In the receiver 200, an antenna 215, an RF band processing part 201, an ADC 202, a carrier correction part 203, a clock correction part 204, an FFT computation part 205, a pilot signal extraction part 206, a channel characteristic estimation part 207, a time direction extraction part 208, a FFT computation part 209, and a spectrum center phase calculation part 210 are similar to the antenna 115, the RF band processing part 101, the ADC 102, the carrier correction part 103, the clock correction part 104, the FFT computation part 105, the pilot signal extraction part 106, the channel characteristic estimation part 107, the time direction extraction part 108, the FFT computation part 109, and the spectrum center phase calculation part 110 of the first embodiment. Accordingly, redundant explanation for those components is omitted.

A first frequency direction extraction part 211-1 extracts estimated channel characteristic values, for example, every twelve carriers in the frequency direction. A second frequency direction extraction part 211-2 extracts estimated channel characteristic values, for example, every three carriers in the frequency direction.

The output from the first frequency direction extraction part 211-1 is subject to IFFT at an IFFT computation part 212-1, and a first delay profile is supplied to a desired wave delay estimation part 213. The output from the second frequency direction extraction part 211-2 is subject to IFFT at an IFFT computation part 212-2, and a second delay profile is supplied to the desired wave delay estimation part 213.

The desired wave delay estimation part 213 combines the two delay profiles to determine a delay time (delay quantity) of each desired wave contained in the combined delay profile. A delay variation calculation part 214 calculates a delay variation in time Δt based upon the delay quantities of the combined delay profile, and determines a clock correction value corresponding to the delay variation.

FIG. 8 illustrates frequency direction extraction of estimated channel characteristic values at different extraction intervals. IFFT is applied to the channel characteristic values extracted every twelve carriers by the first frequency direction extraction part 211-1 to acquire a delay profile #1. IFFT is also applied to the channel characteristic values extracted every three carriers by the second frequency direction extraction part 211-2 to acquire a delay profile #2. By combining the delay profile #1 and the delay profile #2, a combined delay profile P is acquired.

When the carrier input interval "B" for the IFFT computation is changed, the maximum measurable or analyzable delay time (referred to as the "maximum delay time") in the delay profile and the resolution per IFFT point change. Assuming that the OFDM symbol length is $T_s$ and that the number of IFFT points is N, then the maximum delay time and the resolution of each of the delay profiles #1 and #2 become as follows.

When the carrier input interval is twelve (B=12), the maximum delay time is $T_s/12$ and the resolution is $T_s/12*N$. When the carrier input interval is three (B=3), the maximum delay time is $T_s/3$ and the resolution is $T_s/3*N$. Hence, the maximum delay time and the resolution are inversely proportional to the carrier input interval for the IFFT computation. The greater the carrier input interval "B", the smaller the maximum delay time is and the greater the resolution is.

Comparing the delay profile #1 at the interval of twelve (B=12) to the delay profile #2 at the interval of three (B=3), the interval of twelve makes the delay profile four time as accurate as the interval of three, and the monitoring accuracy for delay time D of the desired wave can be improved. However, the maximum delay time measurable at the interval of twelve (B=12) is $T_s/12$. If the delay time D of the desired wave exceeds $T_s/12$, fold-back or replication occurs and a mirror image is replicated at a position of delay time D' defined by Formula (4) where D' is greater than zero and smaller than $T_s/12$.

Formula (4) is expressed below.

$$D'=D-(T_s/12)*k \quad (4)$$

Where $0<D'<T_s/12$, and k is an integer. On the other hand, the maximum delay time measurable at interval of three (B=3) is $T_s/3$, and a desired wave can be measured at delay time D exceeding $T_s/12$, which desired wave cannot be measured in the delay profile #1 produced at the carrier input interval of twelve.

Regarding the resolution per IFFT point, the delay profile #1 at interval of twelve (B=12) is more advantageous. Regarding the maximum measurable delay time, the delay profile #2 at interval of three (B=3) is more advantageous. To ensure both advantages, the desired waves acquired from both the delay profile #1 and the delay profile #2 are combined.

Figure 9:
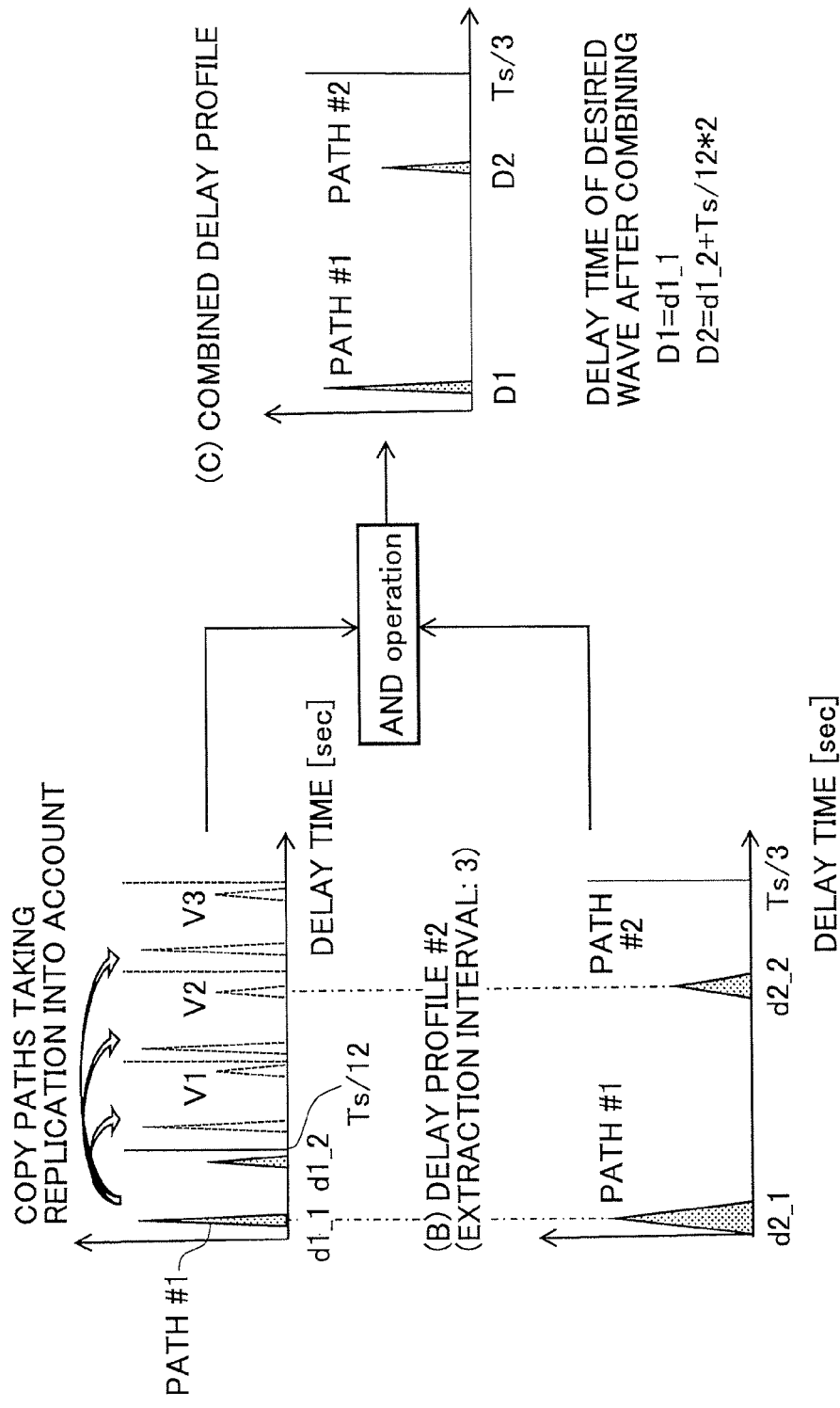
FIG. 9 illustrates an actual example of combining multiple delay profiles.

FIG. 9 illustrates the process of combining the delay profiles #1 and #2, each profile representing delay times of desired waves. First, a set of delay times (D1_1, d1_2) is acquired from the delay profile #1 of the input interval of twelve (B=12). Then, delay time Dj_k (K=0, 1, 2, and 3) that takes fold-back into account is determined from the delay times of the desired wave.

Assuming that the desired wave delay time in the delay profile #1 is d1_j, the delay time Dj_k taking the fold-back into account is expressed by Formula (5).

$$Dj\_k=d1\_j+(T_s/12)*k \quad (5)$$

where k is an integer. Formula (5) is derived from Formula (4), and the original delay time Dj of the desired wave exists in delay time Dj_k.

Meanwhile, if the original delay time Dj of the desired wave exists in the range $0<Dj<T_s/3$, then the delay times (d2_1, d2_2) measured in the delay profile #2 at interval of three (B=3) conform to the original delay time Dj of the desired wave. However, the resolution of the delay times in the delay profile #2 is coarser than the delay times (d1_1, d1_2) measured in the delay profile #1 at interval of twelve (B=12).

Then, comparison (AND operation) is made between the delay time Dj_k determined by Formula (5) at interval of twelve (B=12) and the set of delay times (d2_1, d2_2) of the desired wave at interval of three (B=3) so as to take the delay time Dj of the desired wave into a delay profile at a higher resolution.

For example, path #1 of the delay profile #2 appears at almost the same time (position along the time axis) as the path #1 of the delay profile #1. Thus, delay time d2_1 nearly equals d1_1.

Path 2 of the delay profile #2 appears at almost the same position along the time axis as the fold-back image V2 of the delay profile #1, and d2_2≅d1_2+($T_s$/12)*2 stands. This situation corresponds to d1_2+($T_s$/12)*2=d2_2 (k=2) defined by Formula (5).

From the foregoing, delay times D1 and D2 of the desired waves are determined below.

D1=d1_1

D2=d1_2+($T_s$/12)*2

Through the AND operation, the combined profile including the delay times D1 and D2 of the desired waves is acquired. The combined profile has the advantage of the maximum measurable delay time of the delay profile #2 at input interval of three (B=3) and the advantage of the resolution of the delay profile #1 at input interval of twelve (B=12).

Third Embodiment

Figure 10:
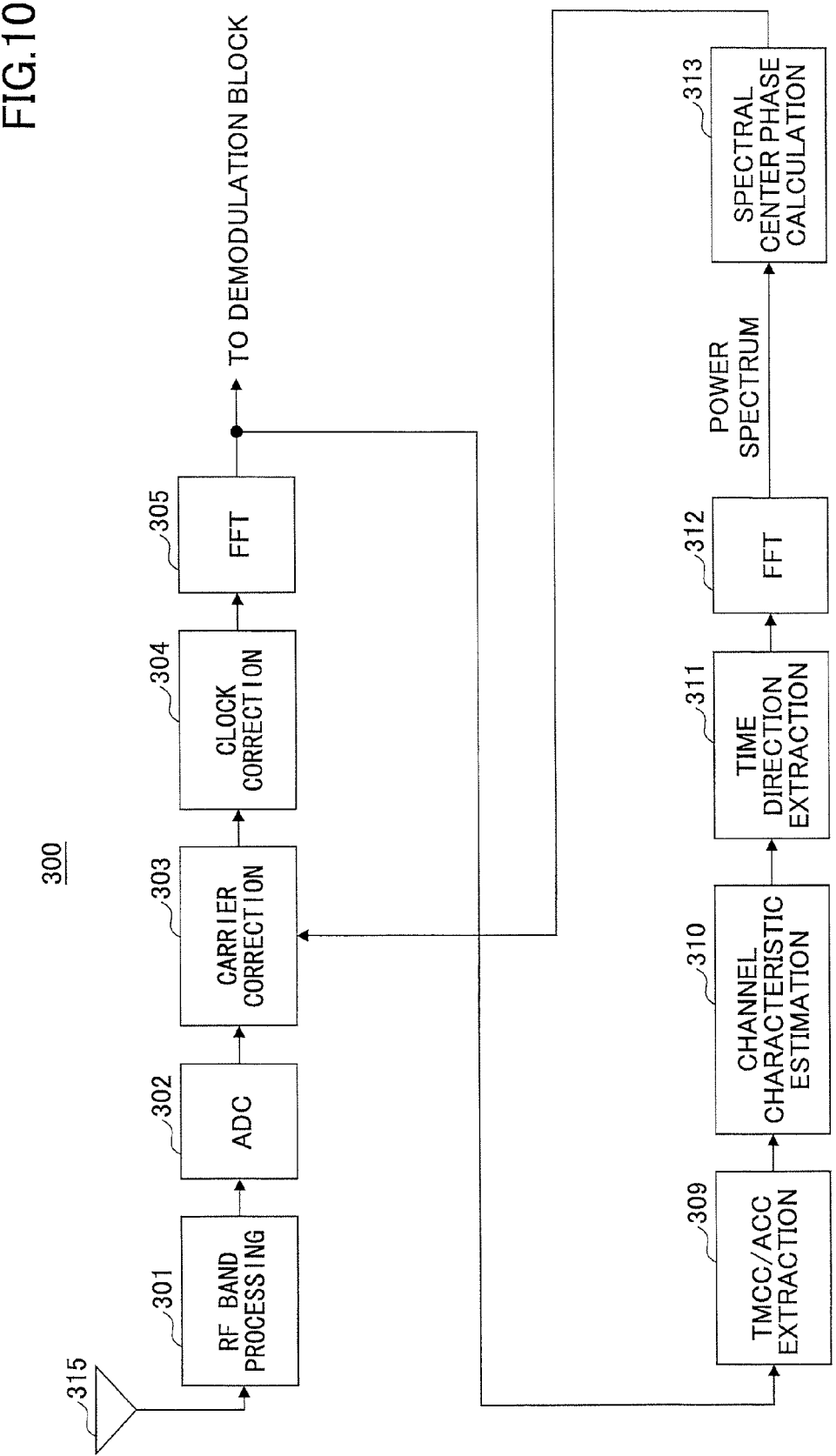
FIG. 10 is a schematic diagram of a receiver according to the third embodiment.

FIG. 10 is a schematic diagram of a receiver 300 according to the third embodiment. In the first embodiment and the second embodiment, carrier correction and clock correction are made using channel characteristic values estimated from pilot carriers. However, channel characteristic values may be estimated from an arbitrary carrier signal other than the pilot carrier.

For example, in ISDB-T, transmission and multiplexing configuration control (TMCC9 signal and auxiliary channel (AC) signal are transported on particular carriers as transmission control signals. These control signals are subject to differential binary phase-shift keying (DBPSK) and they can be demodulated easier than data signals. Accordingly, a part of the output from an FFT computation part 305 is supplied to a TMCC/ACC extraction part 309.

The TMCC/ACC extraction part 309 extracts a transmission control signal (TMCC signal or ACC signal) from the signal received at an antenna 315 and processed at an RF band processing part 301, an ADC 302, a carrier correction part 303, a clock correction part 304, and a FTT computation part 305. A channel characteristic estimation part 310 estimates channel characteristic values from the extracted transmission control signal. A time direction extraction part 311 extracts channel characteristic values in the time direction from the estimated channel characteristic values. A FFT computation part 312 performs fast Fourier transform on the time domain signal and acquires a power spectrum (FIG. 3). A spectrum center phase calculation part 313 calculates an offset of the center phase (frequency) $f_c$ from a target value (for example, the point of origin) as illustrated in FIG. 4, and feeds the calculation result back to the carrier correction part 303.

Although not illustrated in the figure, channel characteristic values may be extracted in the frequency direction from the estimated values, and IFFT and the operations illustrated in FIG. 6 may be performed to calculate delay variation for clock correction, as in the first embodiment and the second embodiment. In place of TMCC or ACC signals, channel estimation may be performed based upon demodulation result of a control signal having been modulated in a modulation scheme with a low coding rate and being easy to demodulate.

In this manner, carrier frequency offset or clock frequency offset can be corrected at high accuracy and the orthogonality between subcarriers can be maintained even under the situation where correction error may occur due to multipath environment or channel variation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

The invention claimed is:

1. A receiver comprising:
   a transformation circuit configured to convert a time domain received signal to a frequency domain signal;
   a known signal extraction circuit configured to extract a known signal from the frequency domain signal;
   an estimation circuit configured to estimate a channel characteristic based upon the extracted known signal;
   a time direction extraction circuit configured to extract channel characteristic values of a particular carrier in a time direction from the estimated channel characteristic;
   a power spectrum acquiring circuit configured to acquire a power spectrum from the channel characteristic values extracted in the time direction;
   an error calculation circuit configured to calculate a carrier frequency error from the power spectrum; and
   a carrier correction circuit configured to correct for a carrier frequency of the received signal based upon the carrier frequency error.

2. The receiver according to claim 1, further comprising:
   a frequency direction extraction circuit configured to extract channel characteristic values of a particular symbol in a frequency direction from the estimated channel characteristic;
   a delay profile acquiring circuit configured to acquire a delay profile from the channel characteristic values extracted in the frequency direction;
   a delay variation calculation circuit configured to calculate a delay variation of a desired wave contained in the delay profile and determine a clock frequency error based on the delay variation; and
   a clock correction circuit configured to perform clock correction on the time domain received signal based upon the clock frequency error.

3. The receiver according to claim 2, wherein
   the delay variation calculation circuit is configured to measure a first delay variation of a first desired wave and a second delay variation of a second desired wave, and calculate the clock frequency error based upon an average value of the first delay variation and the second delay variation if a difference between the first delay variation and the second delay variation is smaller than a predetermined value.

4. The receiver according to claim 3, wherein
   the delay variation calculation circuit is configured to set the clock frequency error to null if the difference between the first delay variation and the second delay variation is at or above the predetermined value.

5. The receiver according to claim 3, wherein the delay variation calculation circuit is configured to calculate the clock frequency error based upon the first delay variation of the first desired wave if a delay time of the second desired wave cannot be measured and if a delay time of the first desired wave is less than a threshold value.

6. The receiver according to claim 1, wherein the known signal is a pilot signal scattered in data signals or a transmission control signal of terrestrial digital broadcasting.

7. A receiver comprising:
a transformation circuit configured to convert a time domain received signal to a frequency domain signal;
a known signal extraction circuit configured to extract a known signal from the frequency domain signal;
an estimation circuit configured to estimate a channel characteristic based upon the extracted known signal;
a first frequency direction extraction circuit configured to extract channel characteristic values of a particular symbol at a first extraction interval in a frequency direction from the estimated channel characteristic;
a second frequency direction extraction circuit configured to extract channel characteristic values of said particular symbol at a second extraction interval in the frequency direction from the estimated channel characteristic;
a first delay profile acquiring circuit configured to acquire a first delay profile from the channel characteristic values extracted by the first frequency direction extraction part-circuit;
a second delay profile acquiring circuit configured to acquire a second delay profile from the channel characteristic values extracted by the second frequency direction extraction circuit;
a desired wave delay estimation circuit configured to combine the first delay profile and the second delay profile to acquire a delay time of a desired wave;
a delay variation calculation circuit configured to calculate a delay variation of the desired wave based upon the delay time of the desired wave and determine a clock frequency error based on the delay variation; and
a clock correction circuit configured to perform clock correction on the time domain received signal based upon the clock frequency error.

8. The receiver according to claim 7, wherein the desired wave delay estimation circuit is configured to determine a position of a fold-back image in the first delay profile based upon a maximum delay time measurable in the first delay profile, and combine the first delay profile having the position of the fold-back image with the second delay profile to determine the delay variation of the desired wave.

9. The receiver according to claim 7, wherein the known signal is a pilot signal scattered in data signals.

10. The receiver according to claim 7, wherein the known signal is a transmission control signal of terrestrial digital broadcasting.

11. A synchronization correcting method comprising:
at a receiver, converting a time domain received signal to a frequency domain signal;
extracting a known signal from the frequency domain signal;
estimating a channel characteristic based upon the extracted known signal;
extracting channel characteristic values of a particular carrier in a time direction from the estimated channel characteristic;
acquiring a power spectrum from the channel characteristic values extracted in the time direction;
calculating a carrier frequency error from the power spectrum; and
correcting for a carrier frequency of the time domain received signal based upon the carrier frequency error.

12. The synchronization correcting method according to claim 11, further comprising:
extracting channel characteristic values of a particular symbol in a frequency direction from the estimated channel characteristic;
acquiring a delay profile from the channel characteristic values extracted in the frequency direction;
calculating a delay variation of a desired wave contained in the delay profile to determine a clock frequency error based on the delay variation; and
performing clock correction on the time domain received signal based upon the clock frequency error.

13. The synchronization correcting method according to claim 12, wherein the determination of the clock frequency error includes
measuring a first delay variation of a first desired wave in the delay profile and a second delay variation of a second desired wave in the delay profile, and
if a difference between the first delay variation and the second delay variation is smaller than a predetermined value, determining the clock frequency error based upon an average of the first delay variation and the second delay variation.

14. The synchronization correcting method according to claim 13, wherein the determination of the clock frequency error includes
if the difference between the first delay variation and the second delay variation is at or above the predetermined value, setting the clock frequency error to null.

15. The synchronization correcting method according to claim 13, wherein the determination of the clock frequency error includes
if a delay time of the second desired wave cannot be measured and if a delay time of the first desired wave is less than a threshold value, calculating the clock frequency error based upon the first delay variation of the first desired wave.

16. The synchronization correcting method according to claim 11, wherein the known signal is a pilot signal scattered in data signals or a transmission control signal of terrestrial digital broadcasting.

* * * * *

UNITED STATES PATENT AND TRADEMARK OFFICE
CERTIFICATE OF CORRECTION

PATENT NO. : 9,065,717 B2
APPLICATION NO. : 14/183146
DATED : June 23, 2015
INVENTOR(S) : Masataka Umeda It is certified that error appears in the above-identified patent and that said Letters Patent is hereby corrected as shown below:

Title Page

Assignees reads:

(73) Assignees: FUJITSU LIMITED, Kawasaki (JP); ~~FUJITSU SEMICONDUCTOR LIMITED~~, Yokohama (JP)

Assignees should read:

(73) Assignees: FUJITSU LIMITED, Kawasaki (JP); SOCIONEXT INC., Yokohama (JP)

Signed and Sealed this
Third Day of November, 2015

Michelle K. Lee
*Director of the United States Patent and Trademark Office*